(12) United States Patent
Kirkpatrick et al.

(10) Patent No.: US 9,835,415 B2
(45) Date of Patent: Dec. 5, 2017

(54) METHOD AND PROCESS OF MAKING CAMOUFLAGE PATTERNS

(71) Applicants: Stephen Edward Kirkpatrick, Madison, MS (US); Steven Michael Maloney, Ridgeland, MS (US)

(72) Inventors: Stephen Edward Kirkpatrick, Madison, MS (US); Steven Michael Maloney, Ridgeland, MS (US)

( * ) Notice: Subject to any disclaimer, the term of this patent is extended or adjusted under 35 U.S.C. 154(b) by 0 days.

(21) Appl. No.: 15/005,246

(22) Filed: Jan. 25, 2016

(65) Prior Publication Data

US 2016/0209177 A1  Jul. 21, 2016

Related U.S. Application Data

(63) Continuation of application No. 14/600,190, filed on Jan. 20, 2015, now Pat. No. 9,322,620, which is a (Continued)

(51) Int. Cl.
*F41H 3/00* (2006.01)
*F41H 3/02* (2006.01)
(Continued)

(52) U.S. Cl.
CPC ............ *F41H 3/00* (2013.01); *F41H 3/02* (2013.01); *G06K 15/1878* (2013.01); (Continued)

(58) Field of Classification Search
CPC ......... F41H 3/00; F41H 3/02; G06K 15/1878; G06T 3/4038; G06T 7/13; G06T 2207/10024; G06T 2207/10028; G06T 2207/10148; G06T 2207/10152; G06T 2207/20221; G06T 2207/30188; H04N 1/3876; H04N 1/6072; H04N 1/6083; H04N 1/6086
See application file for complete search history.

(56) References Cited

U.S. PATENT DOCUMENTS 4,576,904 A  3/1986 Anitole
4,931,320 A  6/1990 Leonard
(Continued)

*Primary Examiner* — Manav Seth
(74) *Attorney, Agent, or Firm* — Baker Donelson

(57) ABSTRACT

A pattern for camouflage and a method for making the pattern. The method includes taking photographic images from the perspective of the selected animal or bird. In one embodiment, the photographic image can be taken from above so as to create a finite background within the selected environment. In another embodiment, the pattern is adapted to be seamlessly repeatable across a surface. The method includes placing desired harvested abstracts into the photographic scene to obtain the overall desired effect of the camouflage pattern including color, composition, depth and repeat. The method also includes taking multiple photographs of the same scene from the same exact spot focusing on different parts of the photographic scene to add clarity to certain portions of the images, enhance depth, and reach desired color palate. The method includes adjusting the color of objects, including water within the photographic scene, to reflect true color of objects absent outside conditions.

26 Claims, 4 Drawing Sheets

Figure 1A:
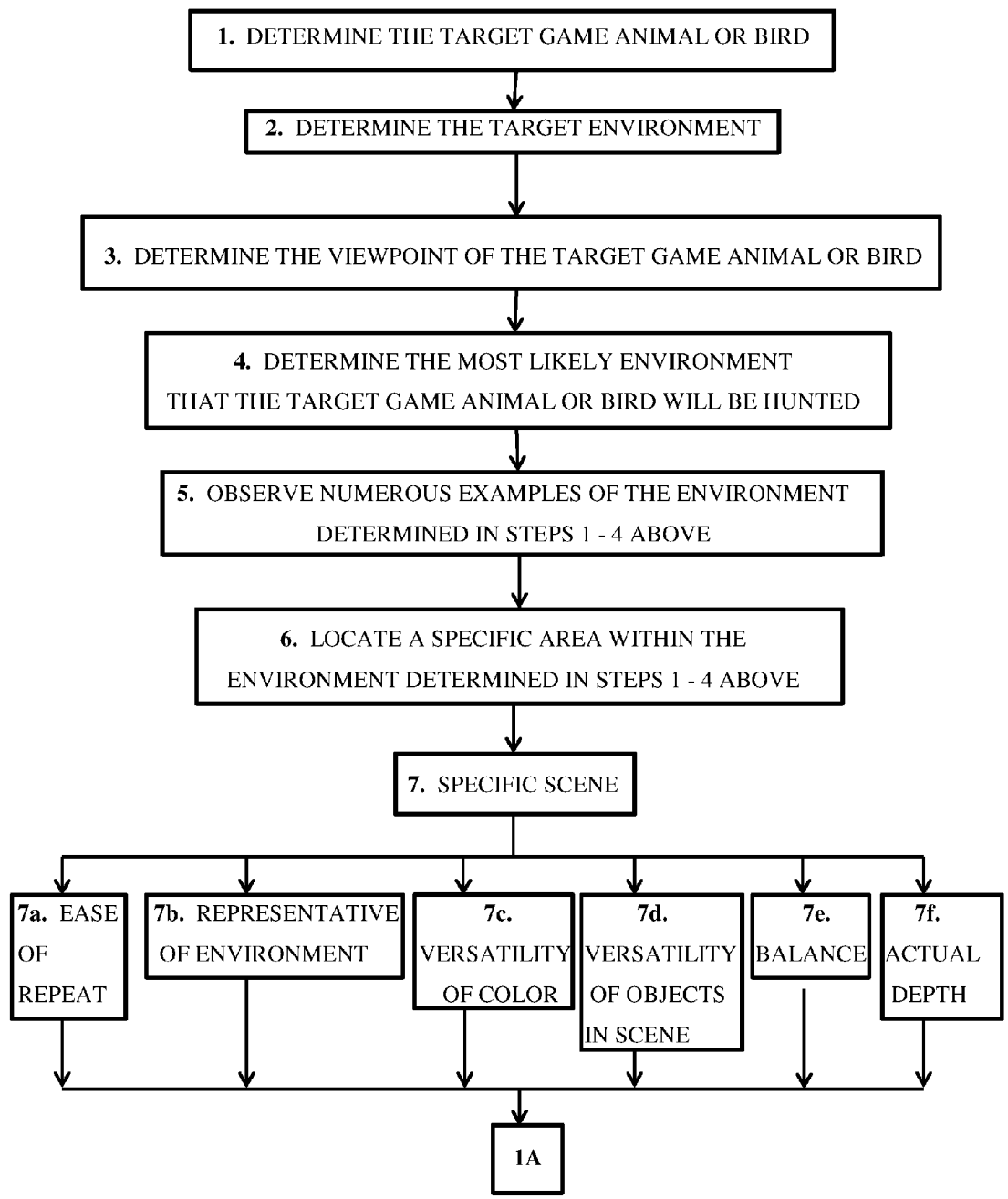

Related U.S. Application Data continuation of application No. 14/455,918, filed on Aug. 10, 2014, now Pat. No. 8,971,661, which is a continuation of application No. 13/137,835, filed on Sep. 15, 2011, now abandoned.

(60) Provisional application No. 61/403,424, filed on Sep. 16, 2010.

(51) Int. Cl.
*G06K 15/02* (2006.01)
*G06T 3/40* (2006.01)
*H04N 1/387* (2006.01)
*H04N 1/60* (2006.01)
*G06T 7/13* (2017.01)

(52) U.S. Cl.
CPC ............. *G06T 3/4038* (2013.01); *G06T 7/13* (2017.01); *H04N 1/3876* (2013.01); *H04N 1/6072* (2013.01); *H04N 1/6083* (2013.01); *H04N 1/6086* (2013.01); *G06T 2207/10024* (2013.01); *G06T 2207/10028* (2013.01); *G06T 2207/10148* (2013.01); *G06T 2207/10152* (2013.01); *G06T 2207/20221* (2013.01); *G06T 2207/30188* (2013.01)

(56) References Cited

U.S. PATENT DOCUMENTS

| | | |
|---|---|---|
| 5,013,375 A | 5/1991 | Leonard |
| 5,409,760 A | 4/1995 | Neitz et al. |
| 5,727,253 A | 3/1998 | Wilkinson |
| 5,753,323 A | 5/1998 | Andrus |
| 5,924,131 A | 7/1999 | Wilkinson |
| 5,972,479 A | 10/1999 | Lehman |
| 6,009,209 A | 12/1999 | Acker et al. |
| 6,011,595 A | 1/2000 | Henderson et al. |
| 6,128,108 A | 10/2000 | Teo |
| 6,342,290 B1 | 1/2002 | Conk |
| 6,349,153 B1 | 2/2002 | Teo |
| 6,496,599 B1 | 12/2002 | Pettigrew |
| 6,682,879 B2 | 1/2004 | Conk |
| 6,912,440 B2 | 6/2005 | Tooley |
| 6,943,915 B1 | 9/2005 | Teraue |
| 7,054,482 B2 | 5/2006 | Mao |
| 7,130,488 B2 | 10/2006 | Harrington et al. |
| 7,215,792 B2 | 5/2007 | Sharma et al. |
| 7,283,140 B2 | 10/2007 | Zhou et al. |
| 7,333,670 B2 | 2/2008 | Sandrew |
| 7,775,919 B2 | 8/2010 | Oswald et al. |
| 7,900,645 B2 | 3/2011 | Bunce et al. |
| 7,958,878 B2 | 6/2011 | Hoffmann |
| 8,084,078 B2 | 12/2011 | Burrell |
| 8,189,212 B2 | 5/2012 | Uchida et al. |
| 8,340,358 B2 | 12/2012 | Cincotti et al. |
| 8,493,391 B2 | 7/2013 | Arabolos |
| 8,971,661 B2 | 3/2015 | Maloney |
| 2003/0130566 A1 | 7/2003 | Hawkes |
| 2005/0005339 A1 | 1/2005 | Johnson |
| 2012/0069197 A1* | 3/2012 | Maloney .................. F41H 3/00 348/207.1 |

\* cited by examiner

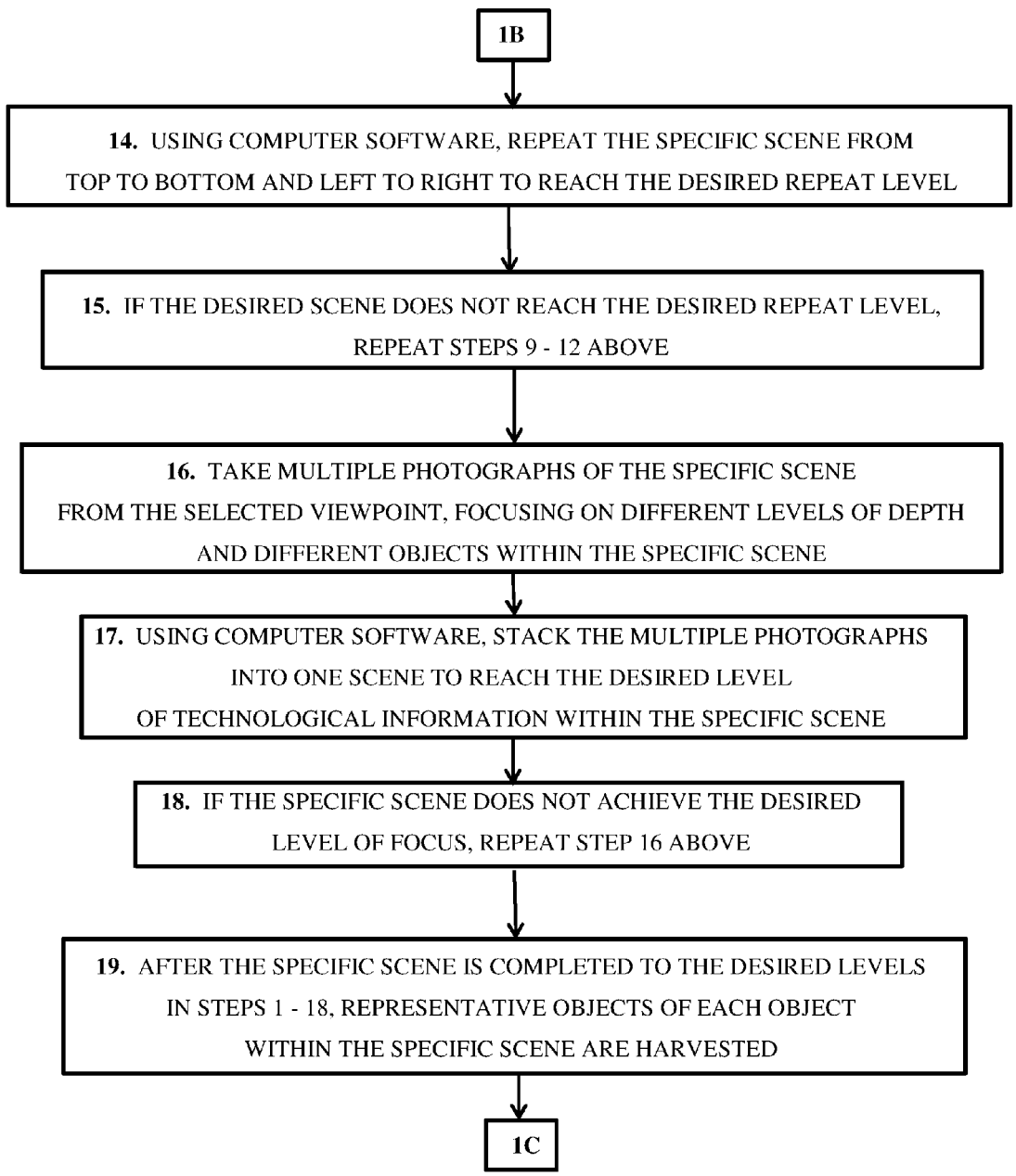

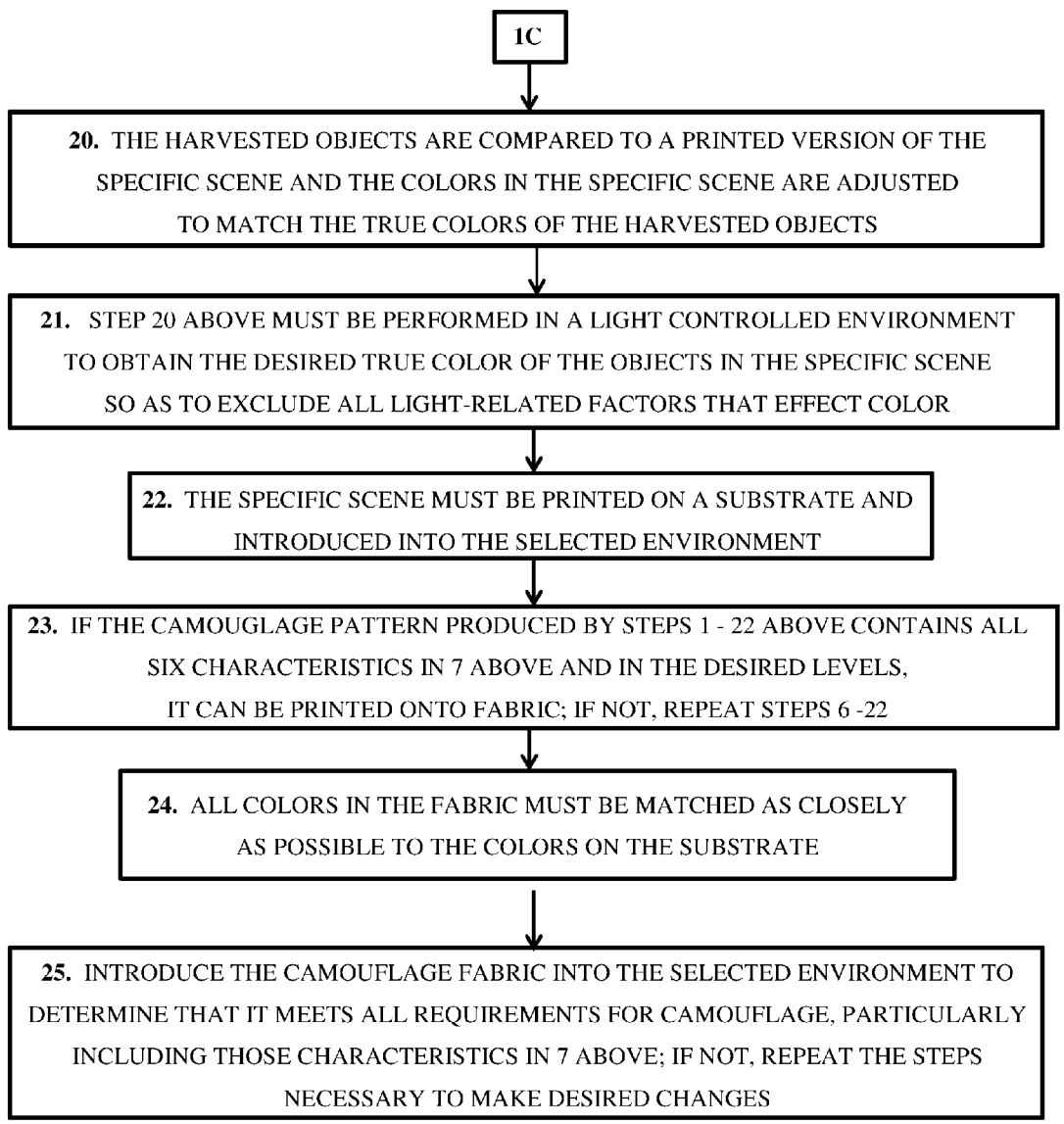

METHOD AND PROCESS OF MAKING CAMOUFLAGE PATTERNS

BACKGROUND

1. The Field of the Invention

This invention relates to a pattern for camouflaging a user and to novel methods for making a pattern for camouflage.

2. The Background Art

Since World War II, a variety of patterns have been designed to camouflage people and objects in an outdoor environment. Military personnel use camouflage clothing for combat and training. Other users of camouflage include hunters, bird watchers, paint ball players and other outdoor recreation enthusiasts. Camouflage prevents people from being detected by other people and animals. A good camouflage can allow hunters and other wildlife watchers to avoid startling wildlife. Camouflage aids the military in performing covert operations and hiding from enemy fire.

Early camouflage was a single color, often a shade of green or brown. More recent camouflage arrangements include repeating geometric shapes with borders. This type of camouflage typically has two or three colors, including green, brown, or black. A green version of this camouflage is designed for hiding a person in a forested environment. Another version of this camouflage is light brown with dark borders around the geometric shapes to match a dry, desert background.

Camouflage clothing manufacturers have recently attempted to create a more realistic appearance by using plant-like three-dimensional additions. However, this camouflage is noisy, cumbersome and may catch on snags.

Camouflage clothing manufacturers have recently attempted to create a more realistic appearance by gathering photographic images and placing them in a perspective relationship so as to create the appearance of depth.

Camouflage clothing manufacturers have also recently attempted to create a more realistic appearance by gathering photographic images representing various desired colors to depict a desired pattern simulating a particular environment.

Camouflage clothing manufacturers have also recently attempted to create a more realistic appearance by gathering photographic images and placing portions of those images on the corners and edges of a pattern to create a repeating pattern of camouflage.

Camouflage clothing manufacturers have also recently attempted to create a more thorough pattern of camouflage by stacking smaller objects in a synthetic perspective relationship to create depth and to create the appearance of vegetation reaching to the top of the horizon in an infinite background setting.

Camouflage clothing manufacturers have also recently attempted to create depth and achieve desired color contrast by creating a background with a conglomerate of desired colors and blends giving the appearance of depth and distance that is out of focus.

Camouflage clothing manufacturers have also recently attempted to create a diverse pattern by gathering photographic images and placing portions of those images within a pattern to create a diverse pattern useful in different environments.

Camouflage clothing manufacturers have also recently attempted to create confusion in their pattern by using various color schemes and blends that attempt to avoid identification of the person wearing the camouflage pattern.

Prior art configurations fail to create a realistic waterfowl camouflage pattern because they all fail to incorporate water which is the primary part of the selected environment of waterfowl.

Prior configurations fail to create a realistic depiction of a particular environment because the images within the configuration are arranged in a synthetic relationship on a computer.

Prior art configurations fail to create realism because they fail to create an environment scene of Mother Nature. Many times the prior art only contains various objects of a selected environment without proper realistic assimilation of the elements of the environment.

The prior art is developed primarily in a computer room with various photographic images and is almost entirely synthetically created. This synthetic creation takes away from the realism of the art.

Every time a portion of the prior art is altered with a computer from its original natural state it loses its realism, particularly depth. As a result, the currently available camouflage patterns totally lack realism.

In order to achieve the goals of camouflage including but not limited to: 1) creating the realistic appearance of depth; 2) matching of the desired environment; 3) versatility of images; 4) versatility of colors; 5) concealment in the selected environment; 6) proper separation of objects in the camouflage (not too busy and not too open); 7) a pattern repeat that does not take away from the effectiveness of the pattern or the marketability of the pattern; and, 8) creating the most realistic camouflage possible, the inventor must leave the computer room and spend his/her entire time in the field. The current inventors are hunters and photographers and create their camouflage patterns almost entirely in the field, which is the best place to create the most realistic image.

One of the inventors' primary goals of the camouflage is to create realistic depth within the camouflage. Realistic depth is the most important aspect of camouflage. Depth within a surface is not associated with danger and, therefore, is the most important aspect of camouflage.

The prior art does not contain realistic depth or, alternatively, can be improved upon tremendously.

The photographic images in prior art have not been altered to depict the true color of the photographed objects because the elements and conditions contribute to the color captured by the photograph. The color must, therefore, be adjusted back to its natural state absent outside conditions affecting colors.

The color and image of water must also be adjusted and altered, both in the field and in the computer room, to achieve the desired color and image for the desired camouflage pattern.

BRIEF SUMMARY OF THE INVENTION AND OBJECTS OF THE INVENTION

To achieve the foregoing and other advantages, the present invention, briefly described, provides a camouflage pattern comprising naturally occurring objects within a particular photographic scene along with other naturally occurring objects that have been harvested from either that particular environment or another naturally occurring environment. Those harvested naturally occurring objects are incorporated into the particular photographic scene to accomplish a number of objectives including but not limited to: 1) adding depth to the environment; 2) matching of the desired environment; 3) versatility of images; 4) versatility of colors; 5) concealment in the selected environment; 6) proper separation of objects in the camouflage (not too busy and not too open); and 7) a pattern repeat that does not take away from the effectiveness of the pattern or the marketability of the pattern. Along with the primary objective of creating the most realistic and effective camouflage possible with presently available technology.

The most realistic and effective camouflage must be designed primarily in the field and from the viewpoint of the particular animal or bird from which camouflage is sought. To that end, all photographic images must be taken from that particular viewpoint. Additionally, to reproduce the exact color of all of the objects in the photographs, pictures must be developed and produced on a surface. Portions of the objects depicted in the photograph must be matched with the photographic images to adjust the photographic color of the objects back to their original natural color prior to being subjected to the exterior conditions. Water color must sometimes be adjusted to counteract the reflective quality of water. Additionally, to reflect the true nature of the photographic scene used as the camouflage pattern, multiple pictures must be taken from the same exact viewpoint focusing on the various layers of the scene. This must be done due to the fact that the camera lens can only focus on particular objects. Also multiple shots of the same scene can be taken with close-ups on particular objects usually in the foreground to increase the resolution of the entire photographic scene. This adjustment must be made because the camera can't focus like the human or animal eye.

In summary, to produce the most realistic camouflage possible, the inventor must leave the computer room and get into the desired environment that he/she wishes to conceal within.

The above brief description sets forth rather broadly the more important features of the present invention in order that the detailed description thereof that follows may be better understood, and in order that the present contributions to the art may be better appreciated. There are, of course, additional features of the invention that will be described in detail hereinafter.

In this respect, before explaining a number of preferred embodiments of the invention in detail, it is understood that the invention is not limited in its application to the details of the construction and to the arrangements of the components set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention.

It is an object of the present invention to provide a new and improved camouflage article and method which has all of the advantages of the prior art and none of the disadvantages.

It is another object of the present invention to provide a new and improved camouflage article and method which may be easily and efficiently manufactured and marketed.

It is a further object of the present invention to provide a new and improved camouflage article and method which is of durable and reliable construction.

An even further object of the present invention is to provide a new and improved camouflage article and method which is susceptible of a low cost of manufacture with regard to both materials and labor, and which accordingly, is then susceptible of low prices of sale to the consuming public, thereby making such camouflage article and method available to the buying public.

Still yet a further object of the present invention is to provide a new and improved camouflage article and method which provides camouflage articles having naturally occurring elements.

A further object of the present invention is to provide a new and improved camouflage article and method that has naturally occurring depth.

A further object of the present invention is to provide a new and improved camouflage article and method having naturally occurring color and versatile color.

A further object of the present invention is to provide new and improved camouflage articles which are versatile in various hunting environments.

Still yet a further object of the present invention is to provide new and improved camouflage articles depicting a naturally occurring environment taken from the viewpoint of the most hunted animal or bird.

A further object of the present invention is to provide a new and improved camouflage article and method having naturally occurring pattern repeat.

A further object of the present invention is to provide a new and improved camouflage article and method having greater definition and clarity of naturally occurring elements.

A further object of the present invention is to provide a new and improved camouflage article and method, having the most realistic depiction of naturally occurring elements as possible, utilizing the most current available technology.

Still yet a further object of the present invention is to provide a new and improved camouflage article and method that is an actual scene within the selected environment that depicts all realistic features within the environment including realistic depth.

BRIEF DESCRIPTION OF FLOW CHART

Figure 1B:
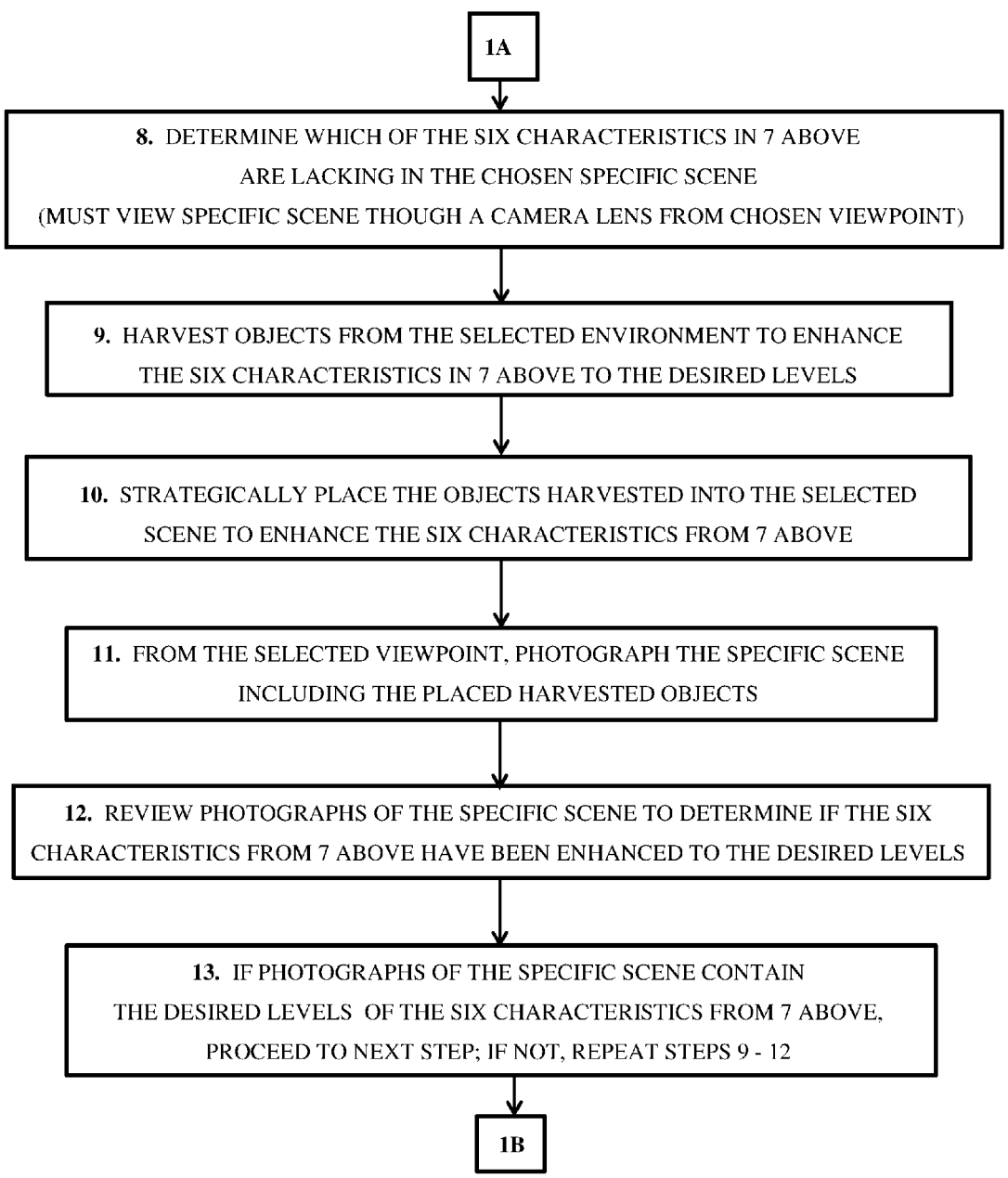

FIGS. 1A, 1B, 1C, and 1D illustrate a flow chart of an embodiment of the process of the present invention is provided as Exhibit "A" to aid in the description of the invention, with connectors 1A, 1B, and 1C connecting the flow chart from FIG. 1A to FIG. 1B; from FIG. 1B to FIG. 1C; and from FIG. 1C to FIG. 1D, respectively.

DETAILED DESCRIPTION OF THE PREFERRED EMBODIMENTS

It will be readily understood that the components of the present invention, as generally described herein, could be arranged and designed in a wide variety of different configurations. Thus, the following more detailed description of the embodiments of the system and method of the present invention is not intended to limit the scope of the invention. The scope of the invention is as broad as claimed herein. The illustrations are merely representative of certain, presently preferred embodiments of the invention. Those presently preferred embodiments of the invention will be best understood by detailed description of the methods of the description.

Those of ordinary skill in the art will, of course, appreciate that various modifications to the details of the description may easily be made without departing from the essential characteristics of the invention. Thus, the following description is intended only by way of example, and simply illustrates certain presently preferred embodiments consistent with the invention as claimed.

An example of the method of the invention is described with reference to FIGS. 1A, 1B, 1C and 1D in a step by step process in detail as follows:

1. The first step in the process is to determine the primary target consumer of the camouflage pattern.

2. After determining the target consumer (i.e. duck hunter, deer hunter, turkey hunter, etc.) The developer will know from what viewpoint (most common view of a duck, deer, turkey, etc.) (hereinafter "selected viewpoint") all of the photographic images will be taken.

3. Select the environment for the camouflage pattern (hereinafter "selected environment").

4. Determine the goal of versatility of the selected environment. This process includes but is not limited to determining how broad you want the pattern to be in terms of effectiveness in particular areas.

5. Gather information in the field for the selected environment. All information must be gathered with photographic images from the selected viewpoint in the selected environment.

6. Based on the desired versatility of the pattern (step 4), photographic information in step 5 must be gathered from a variety of places often requiring extensive travel. The developer must carry means of taking photographic images from the selected viewpoint (i.e. tripods, ladders, tree stands, etc.).

7. The information gathered in step 6 is then analyzed to determine commonality of objects and colors to determine a possible location for the base photographic scene (hereinafter "photographic scene"). The photographic scene will be the base of the camouflage pattern.

8. After determining a possible location for the photographic scene, pictures of many possible scenes are taken. The inventors have spent many days in the field at many different locations to find the photographic scene. This is the most difficult and the most important part of the invention.

9. The photographic scene must include but is not limited to the following: 1) versatility of color; 2) versatility of objects in the scene; 3) maximum depiction of depth; 4) not too busy nor too sparse; 5) must be amenable to a repeating pattern (see steps 16-18); 6) must have as many desired elements as possible for final pattern; 7) ease of working environment is helpful but should not be prohibitive; 8) must be able to add harvested objects to the scene to complete the scene; 9) it is helpful if the objects that are not in the photographic scene can be found and harvested in close proximity to the scene; 10) the scene must contain marketable images that are appealing to the eye; 11) the scene must be both effective for its primary purpose and marketable to consumers; 12) the scene must clearly depict realism and, therefore, cannot be unusual; 13) a primary goal is to pick a scene where many hunters will look at it and say, "that is where I hunt."

10. After determining the base photographic scene, numerous photographs must be taken from the selected viewpoint. These photographs must be taken in various outdoor conditions: variable sunlight and wind and numerous combinations of these two variables.

11. The scene must now be analyzed to determine: 1) whether it is in fact the desired base scene (if not you need to go back to step 4 and start over); 2) what the photographic scene needs to accomplish the ultimate goals including, but not limited to, those related in step 9.

12. In order to create desired versatility of color, objects must be harvested in the field to create a pattern that achieves this objective.

13. In order to create desired versatility of objects within the pattern, objects must be harvested in the field to create a pattern that achieves this objective.

14. In order to create desired versatility of depth, objects must be harvested in the field to create a pattern that achieves this objective.

15. The objects harvested in steps 12, 13, and 14 must now be arranged in the photographic scene and multiple pictures must be taken of the new photographic scene.

16. All edges of the photographic scene must be analyzed to determine ease of repeat. The scene needs to be adjusted to comply with step 17 by adding or taking away harvested objects along the edge and corner of the photographic scene to promote the ease of repeat.

17. All edges of the photographic scene must either be blank or contain objects that can be split from left to right and/or top to bottom to promote a continuous repeat.

18. Patterns containing water are the easiest to create a continuous repeat because water can surround the edges and reflections can be used to repeat items from top to bottom.

19. Multiple pictures of the photographic scene must now be taken at various depths from the same exact viewpoint focusing on different layers of the photographic scene to capture the entire scene at the desired focus level. The camera lens cannot focus like a human eye or animal eye. Numerous photographs must be taken and stacked to reproduce what can be seen by the human or animal eye.

20. The focus of each layer of the photographic scene can be varied slightly from best to worst and front to back to accentuate depth as desired.

21. Multiple photographs from the selected viewpoint must also be taken of selected items within the photographic scene foreground to add information to the final pattern scene. By taking multiple photographs within the scene one can exceed the technological limits of a single photograph by incorporating multiple photographs within the single photographic scene.

22. The color of all objects in the photographic scene must now be adjusted back to "real" color.

23. In order to complete step 22, you must harvest representative samples of all objects within the photographic scene.

24. You must then take separate photographs of every object.

25. The photographs must then be printed on a substrate.

26. The harvested objects are then physically compared to the print substrate.

27. Color is adjusted with the goal of matching the substrate color of the object to the actual color of the harvested object absent outside conditions, (i.e. direct light, shadows, bright light, dim light, etc.)

28. Step 27 is performed as many times as it takes to get the color as close as possible.

29. Steps 22-28 are performed for all objects within the photographic scene.

30. Due to the reflective nature of water, the color may have to be adjusted multiple times to reach the desired color. Photographs of water within the photographic scene must be taken under different conditions (sunlight, cloud cover, dark reflections, light reflections, and combinations of these conditions).

31. Once the developer has a hard copy of the true color of the objects within the photographic scene, he can adjust the color on the screen to match as close as possible. (Note:

The color on the screen will seldom if ever match the color of the print on any substrate, therefore, the color must be adjusted on the screen to match the substrate. This often takes many steps of trial and error.

32. Step 31 must be performed for all objects in the photographic scene.

33. All color adjustments must be transferred to all photographs obtained in steps 19 thru steps 21.

34. Photographs from step 19 must be stacked from farthest to closest to obtain one photographic scene.

35. Close-up pictures of the foreground taken in step 21 can replace the same images on the computer to increase clarity and the amount of photographic information within the photographic scene. This step has the effect of expanding the information within the camouflage file, which increases clarity and allows the image to be expanded without losing clarity.

36. Step 34 also has the effect of expanding the file.

37. Develop a repeating pattern both vertically and horizontally. If the edges are not conducive to the repeat you must go back to steps 16 and 18. Place the photographic scene with repeats on the left and right and top and bottom. This gives a total of five images to check the repeat.

38. If water is part of the photographic scene, the water can be used to fade in and out on the edges of the repeat. Water can also be used to repeat vertically with reflections the same as a mirror.

39. Objects that are on the edges can be split from top to bottom or left to right to develop a continuous repeating pattern that disguises the repeat.

40. A draft of the camouflage pattern is now complete. Repeat the entire process or only the parts of the process that relate to the objects or color that are undesirable within the pattern.

41. In another embodiment, all of the above steps can be performed in another weather season.

42. In another embodiment, all of the above steps can be performed from another animal or bird's viewpoint as identified in step 2.

43. In another embodiment, specifically for turkey hunters, two different photographic scenes can be built due to the need for different patterns on pants and shirts because the hunter is usually sitting down and the desired environment changes from forest floor to the first three horizontal feet of the forest.

44. In another embodiment, specifically for large animal hunters in tree stands, all viewpoint images desired in step 2 are taken from average animal height looking up toward a tree stand. The sky is the background depending on the desired degree of the plant and tree matter covering the sky background.

45. While the invention has been described in connection with what are considered to be exemplary embodiments, it is to be understood that the invention is not limited to the disclosed embodiments, but on the contrary, is intended to cover various modifications and equivalent arrangements included within the spirit and scope of the appended claims.

What is claimed is:

1. A method of formulating a camouflage pattern for use on substrates, comprising the steps of:
    (a) selecting a geophysical location in first outdoor environment for generating a pattern image of the geophysical location from a hunted viewpoint with a camera for use on substrates as a pattern that blends concealingly in a second outdoor environment when a substrate bearing the pattern is positioned in proximity thereto;
    (b) harvesting one or more natural objects in the first outdoor environment and selectively arranging in the geophysical location;
    (c) selectively adjusting edges of the viewpoint of the geophysical location for pattern repeat;
    (d) imaging with the camera from the hunted viewpoint the selected portion of the geophysical location in the first environment to yield a base viewpoint image;
    (e) determining respective vertical and horizontal repeat edges in the base viewpoint image to form a pattern image; and
    (f) printing the pattern image based on the repeat edges on a substrate repeatedly in spaced-apart relation to define the pattern,
    whereby the substrate bearing the pattern, being positioned in the second outdoor environment, blends concealing therewith from the hunted viewpoint.

2. The method as recited in claim 1, wherein the step (a) selecting the geophysical location is based on a selected one of a plurality of game animals to be hunted within the second environment.

3. The method as recited in claim 1, further comprising the steps of repeatedly imaging the geophysical location in the first outdoor environment at a plurality of times, locations, and viewpoints to obtain a plurality of environment images; and
    determining from the plurality of environment images a set of commonalities of objects and colors depicted therein, and
    determining the selected portion for step (d) imaging based on the set of commonalities.

4. The method as recited in claim 1, wherein the step (b) comprises selecting for the harvested object an image at least one of the natural objects depicted in the base environment image based on color, type of object, and depth of the natural object relative to the viewpoint.

5. The method as recited in claim 1, further comprising the step of obtaining a plurality of layer images of the selected portion of the geophysical location at a plurality of different depths taken from the viewpoint and layering a plurality of selected ones of the layer images to form a multiple layer base viewpoint image.

6. The method as recited in claim 5, wherein the layer images are assembled into a stack from a first distance to a second distance relative to the viewpoint, the first distance farther from the viewpoint than the second distance to obtain the multiple layer base viewpoint image.

7. The method as recited in claim 1, further comprising the step of selectively adjusting a position of the harvested object image on a respective one of the repeat edges to facilitate ease of repeat of the pattern.

8. The method as recited in claim 1, further comprising the step of imaging a surface of a body of water for creating a water image for selective inserting over a portion of the repeat edges.

9. The method as recited in claim 1, further comprising the step of adjusting the color of the images of the harvested natural objects based on the color of the natural object in the first outdoor environment.

10. The method as recited in claim 9, where in the step of adjusting the color comprises the steps of obtaining a plurality of images of selected ones of the harvested objects, printing the plurality of images on a respective substrate, comparing the selected harvested object in the first outdoor environment with the printed substrate image, adjusting the color of the harvested image, and repeating until the image color satisfactorily matches the color of the object in the first outdoor environment.

11. The method as recited in claim 1, further comprising the step of expanding the base viewpoint image by changing a selected one of the harvested images with a second selected harvested image.

12. The method as recited in claim 1, further comprising the step of splitting an object image into a first portion and a second portion, the first portion disposed on a respective one of the repeat edges and the second portion disposed on an opposing repeat edge.

13. The method as recited in claim 12, further comprising the step of repeating the splitting step to define a continuous repeating pattern on the opposing repeat edges of each pattern image.

14. The method as recited in claim 1, wherein the camera for imaging provides digital images for the steps of displaying, harvesting, inserting, and printing using a microprocessor computer configured for receiving and manipulating digital images.

15. A method of formulating a camouflage pattern for use on substrates, comprising the steps of:
    (a) selecting for hunting of a type of animal a geophysical location in first outdoor environment for generating a pattern image of the geophysical location relevant to a viewpoint of the type of hunted animal for use on substrates as a pattern that blends concealingly in a second outdoor environment when the substrate bearing the pattern is positioned in proximity thereto for hunting of the type of animal;
    (b) imaging with a digital camera from a first viewpoint a selected portion of the geophysical location in the first environment to yield a digital base viewpoint image;
    (c) operating a microprocessor computer configured for receiving the digital base viewpoint image;
    (d) harvesting from a display of the digital base viewpoint image of a portion thereof depicting at least one natural object as a digital object image;
    (e) selectively inserting at least one digital object image into the digital base viewpoint image to yield a pattern image;
    (f) determining respective repeat edges on the pattern image; and
    (g) printing a plurality of the pattern image based on the respective repeat edges on a fabric substrate repeatedly in spaced-apart relation to define the pattern,
    whereby the fabric substrate bearing the pattern, being positioned as a garment worn by a hunter in the second outdoor environment, blends concealing therewith from the hunted viewpoint.

16. The method as recited in claim 15, further comprising the steps of repeatedly imaging the geophysical location in the first outdoor environment at a plurality of times, locations, and viewpoints to obtain a plurality of environment images; and
    determining from the plurality of environment images a set of commonalities of objects and colors depicted therein, and
    determining the selected portion for step (b) imaging based on the set of commonalities.

17. The method as recited in claim 15, wherein the step (c) comprises selecting for the harvested digital object image at least one of the natural objects depicted in the digital base environment image based on one or more of a color, a type of object, and a depth of field of the natural object relative to the viewpoint.

18. The method as recited in claim 15, further comprising the step of obtaining a plurality of digital layer images of the selected portion of the geophysical location at a plurality of different depths relative to viewpoint and layering a plurality of selected ones of the digital layer images to form a multiple layer viewpoint image.

19. The method as recited in claim 18, wherein the digital layer images are assembled into the multiple layer viewpoint image as a stack from a first distance to a second distance relative to the viewpoint, the first distance farther from the viewpoint than the second distance.

20. The method as recited in claim 15, further comprising the step of selectively adjusting a position of the harvested object image on a respective one of the repeat edges to facilitate ease of repeat of the pattern.

21. The method as recited in claim 15, further comprising the step of imaging a surface of a body of water for creating a water image for selective inserting over a portion of the repeat edges.

22. The method as recited in claim 15, further comprising the step of adjusting the colors of the digital images of the harvested natural object based on the color of the natural object in the first outdoor environment.

23. The method as recited in claim 22, where in the step of adjusting the color comprises the steps of obtaining a plurality of digital images of selected ones of the harvested objects, printing the plurality of digital images on a respective substrate, comparing the appearance of the selected harvested object in the first outdoor environment with the printed substrate image, adjusting the color of the digital harvested image, and repeating until the image color printed on the substrate satisfactorily matches the color of the natural object in the first outdoor environment.

24. The method as recited in claim 15, further comprising the step of expanding the base viewpoint image by replacing a selected one of the digital harvested images in the base viewpont image with a second selected digital harvested image.

25. The method as recited in claim 15, further comprising the step of splitting a digital object image into a first portion and a second portion, the first portion disposed on a respective one of the repeat edges and the second portion disposed on an opposing repeat edge.

26. The method as recited in claim 25, further comprising the step of repeating the splitting step to define a continuous repeating pattern on the opposing repeat edges of each pattern image.

* * * * *